US008700715B1

(12) United States Patent
Schmidt et al.

(10) Patent No.: US 8,700,715 B1
(45) Date of Patent: Apr. 15, 2014

(54) SYSTEM, METHOD AND COMPUTER READABLE MEDIUM FOR PROCESSING UNSOLICITED ELECTRONIC MAIL

(75) Inventors: Jonathan E. Schmidt, San Antonio, TX (US); John A. Murphy, San Antonio, TX (US); Henry M. Donzis, San Antonio, TX (US); Lewis T. Donzis, San Antonio, TX (US); Peter W. Baron, San Antonio, TX (US); Rodney D. Frey, San Antonio, TX (US)

(73) Assignee: Perftech, Inc., San Antonio, TX (US)

( * ) Notice: Subject to any disclaimer, the term of this patent is extended or adjusted under 35 U.S.C. 154(b) by 608 days.

(21) Appl. No.: 12/004,634

(22) Filed: Dec. 24, 2007

Related U.S. Application Data

(60) Provisional application No. 60/877,500, filed on Dec. 28, 2006.

(51) Int. Cl.
*G06F 15/16* (2006.01)
(52) U.S. Cl.
USPC .......................................... 709/206; 709/229
(58) Field of Classification Search
USPC ................................................ 709/206, 229
See application file for complete search history.

(56) References Cited

U.S. PATENT DOCUMENTS

| 6,321,267 | B1 * | 11/2001 | Donaldson .................... 709/229 |
| 7,222,157 | B1 | 5/2007 | Sutton et al. |
| 2003/0023736 | A1 * | 1/2003 | Abkemeier .................... 709/229 |
| 2003/0074397 | A1 * | 4/2003 | Morin et al. ................... 709/203 |
| 2004/0024823 | A1 * | 2/2004 | Del Monte ..................... 709/206 |
| 2005/0120085 | A1 * | 6/2005 | Ito et al. ......................... 709/206 |
| 2005/0207447 | A1 | 9/2005 | Sekiguchi et al. |
| 2005/0210116 | A1 * | 9/2005 | Samson ......................... 709/207 |
| 2006/0015942 | A1 * | 1/2006 | Judge et al. ...................... 726/24 |
| 2006/0020812 | A1 | 1/2006 | Steinberg et al. |
| 2006/0198311 | A1 | 9/2006 | Molen et al. |
| 2007/0047449 | A1 | 3/2007 | Berger et al. |
| 2007/0204033 | A1 | 8/2007 | Bookbinder et al. |

* cited by examiner

*Primary Examiner* — Thomas Dailey

(57) ABSTRACT

An Internet service provider (ISP) is configured to analyze a subscriber's sent e-mail packets to determine a subscriber identity associated with the e-mail packets. A database is then queried to determine a current sending rate of e-mails by the subscriber. A sending rate above an allowed threshold causes the upstream transmission of the e-mail packets to be blocked, optionally by injecting connection destroying packets. A subscriber remains blocked from upstream transmission of e-mails until the sending rate as determined by the ISP drops below a second, more stringent threshold. This automatic process is also accompanied by automated messaging to the subscriber with information as to the measures taken and remedial options.

23 Claims, 5 Drawing Sheets

SYSTEM, METHOD AND COMPUTER READABLE MEDIUM FOR PROCESSING UNSOLICITED ELECTRONIC MAIL

CROSS REFERENCE TO RELATED APPLICATIONS

The present patent application is related to and claims the benefit of provisional patent application No. 60/877,500, filed 28 Dec. 2006, titled "ABUSE SENTRY, AUDIT SENTRY, AUTHENTICATION ICON" the entire contents of which are incorporated by reference herein.

FIELD OF THE INVENTION

This invention relates to monitoring and control of communications through Internet Service Providers (ISPs) and in particular to the monitoring and control of electronic mail communications.

BACKGROUND OF THE INVENTION

Electronic mail, referred to herein as e-mail, has become the premier communication medium. However, the ease and accessibility of e-mail which are its great benefits have also contributed to e-mail's greatest detriment, which is the sending of bulk unsolicited messages known colloquially as spam. The majority of unwanted e-mail, SPAM, originates from the PCs of internet subscribers that are controlled by a virus/Trojan infection. It typically falls to an Internet Service Provide (ISP) to control the spam e-mails in order to maximize bandwidth efficiency for the ISP. In order to prevent spam e-mails from being sent, the Internet Service Providers will typically first identify the infected subscriber who is the source of the spam e-mails, largely from external complaints, and then block further e-mails emanating from the subscriber while simultaneously assisting the subscriber to remove the infection from the subscriber's computer. This largely manual procedure is time consuming and personnel intensive.

What is required is a system, method and computer readable medium that can provide a more automated procedure for handling spam originators within an e-mail network.

SUMMARY OF THE INVENTION

In one embodiment of the disclosure, there is provided a method of blocking an electronic mail transmission comprising monitoring an electronic mail message at a point on a transmission path; determining a subscriber associated with said electronic mail message; determining if said subscriber is a blocked subscriber; and if said subscriber is a blocked subscriber, preventing transmission of said electronic mail message from said point.

In one embodiment of the disclosure, there is provided a network comprising at least one internet service provider that provides an Internet connection for one or more subscribers; and at least one electronic mail processing system comprising at least one database; and at least one query engine that executes one or more queries on said at least one database; wherein said electronic mail processing system receives an electronic mail message received by said at least one internet service provider from said one or more subscribers; wherein said query engine executes a first query on said at least one database to determine a subscriber identity associated with said electronic mail message; wherein said query engine executes a second query on said at least one database to determine a transmission status associated with said subscriber identity; and wherein said electronic mail message is transmitted dependent on said transmission status.

In one embodiment of the disclosure, there is provided an internet service provider comprising at least one router; and a packet processing engine; wherein said at least one router routes one or more electronic mail packets identifying a recipient to said packet processing engine; wherein said packet processing engine determines if said one or more electronic mail packets are to be blocked; wherein if said one or more electronic mail packet are to be blocked, said packet processing engine routes a blocking packet to said router; and wherein said router transmits said blocking packet towards said recipient. Alternatively or in addition, said packet processing engine may optionally route a blocking packet to said router, wherein said router transmits said blocking packet towards a subscriber.

In one embodiment of the disclosure, there is provided a method of operating an Internet service provider comprising receiving one or more packets into the internet service provider from a subscriber; determining if transmission upstream of said one or more packets is to be blocked; and if said transmission upstream of said one or more packets is to be blocked, blocking upstream transmission of said one or more packets.

In one embodiment of the disclosure, there is provided a computer readable medium comprising instructions for receiving a plurality of electronic mail messages from a subscriber; determining a sending rate of said plurality of electronic mail messages; comparing said sending rate with a threshold; and preventing transmission of at least one of said electronic mail messages if said sending rate is above said threshold.

BRIEF DESCRIPTION OF THE DRAWINGS

The invention will now be described, by way of example only, with reference to specific embodiments and to the accompanying drawings in which.

DETAILED DESCRIPTION OF THE INVENTION

In the Applicant's earlier patent applications, U.S. Ser. No. 10/023,674 and U.S. Ser. No. 10/623,893, the entire contents of which are explicitly incorporated herein by reference, the present Applicants described networks in which communications could be provided from an ISP to a subscriber of the ISP. In the referenced applications, a redirection device was placed in the path of upstream traffic from the subscriber. The redirection device, operating under the control of a consolidating and management device elsewhere in the network, processed upstream data packets to determine when targeted communications to the subscriber were required.

Figure 1:
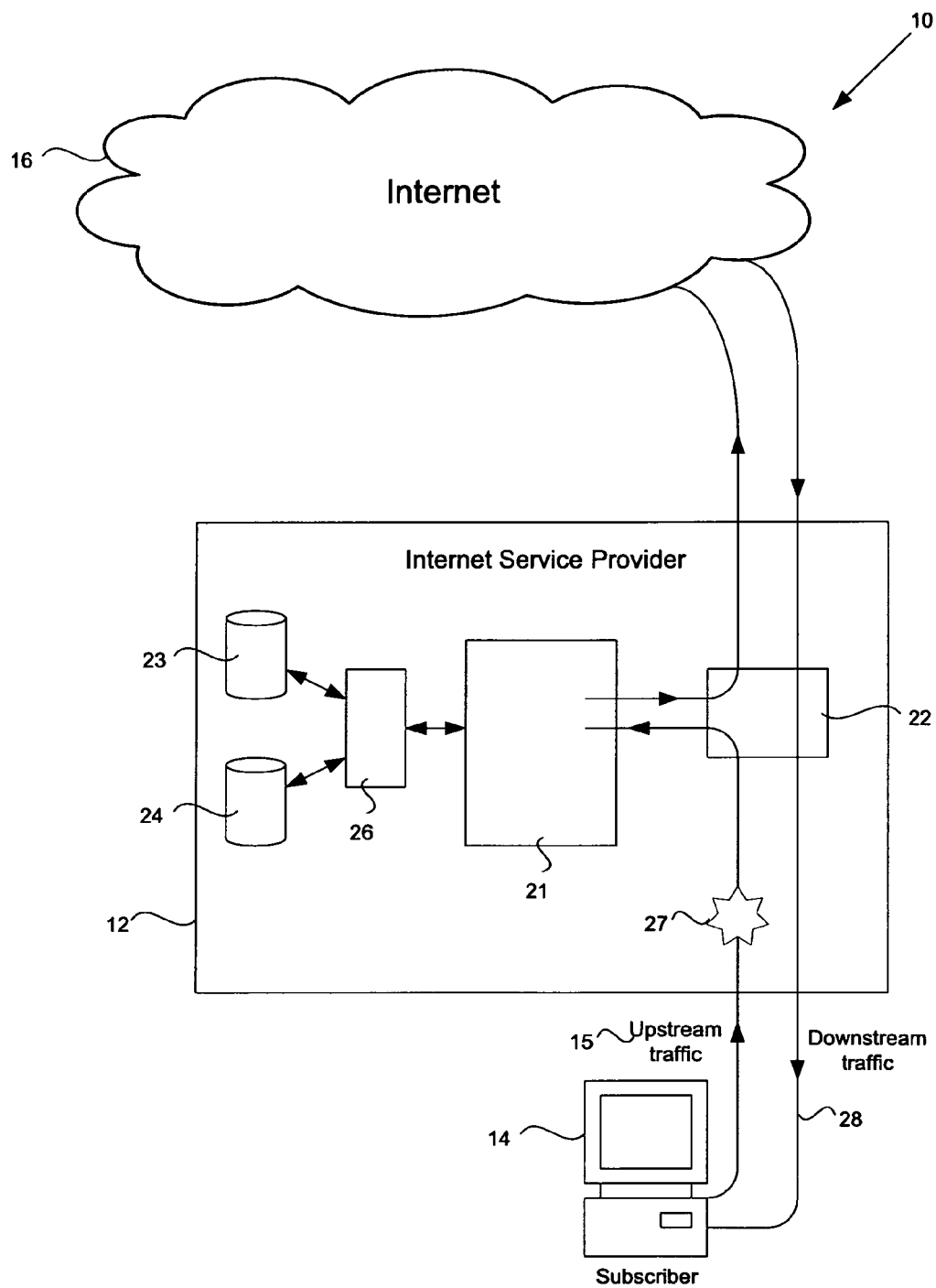
FIG. 1 schematically illustrates a network in accordance with an embodiment of the disclosure.

The present embodiments utilize many of the features and functionalities of the networks described in the Applicant's earlier patent applications referenced above. In FIG. 1, there is shown a system or network 10 in accordance with an embodiment of the disclosure. In the network 10, an ISP 12 provides a link between a subscriber device 14 and the internet 16. For the sake of clarity, in the following embodiments the subscriber device 14 will be referred to specifically as a personal computer, or PC. However, it will be readily understood by the person skilled in the art that the subscriber device 14 may be any internet enabled device such as a personal computer (PC), laptop, palm device, mobile telephone, gaming console and the like, and all such internet enabled devices are to be considered equivalent.

The network 10 includes at least one redirection device 21 that is placed at the path of upstream traffic 15 from the subscriber 14, either in the path or in a position to monitor the path. As described in the above referenced earlier applications, the redirection device 21 may be placed at many points within the network 10 and is preferably placed at an edge of the network that represents the last scaleable point in the operator's network. In one embodiment, the redirection device 21 is placed within the ISP 12. The term redirection device is used herein in order to provide consistency with the Applicant's earlier patent applications referenced above. The person skilled in the art will understand from the foregoing description that in the context of the present disclosure, the redirection device may not perform a redirection function in all embodiments.

The network 10 also includes a consolidating and management device 26, for example of the type as described in the Applicant's earlier applications referenced above. The consolidating and management device 26 is operatively associated with the redirection device 21 to form an electronic mail processing system, and more particularly a packet processing system, as will be described in greater detail below.

The ISP 12 includes a router or switch 22, a redirection device 21 as described above and an address provisioning database 23. The address provisioning database 23 stores associations between subscribers of the ISP and IP addresses allocated to the subscribers. A second database 24 stores associations between subscribers of the ISP and sending rate profiles as will be described below. The consolidating and management device 26 provides a query engine for accessing data from the databases 23, 24 in response to requests from the redirection device 21.

While two databases 23, 24 are illustrated and described herein for clarity, the person skilled in the art will readily understand that the two databases 23, 24 can be consolidated into a single database or that the two databases can be divided into a higher number of databases. For example, the databases 23, 24 may be consolidated with a database for storing an association between users and a subscriber account, as described in the Applicant's co-pending application Ser. No. 12/004,635, the entire contents of which are herein incorporated by reference. Alternatively or in addition, the databases 23, 24 may be consolidated with a database for storing an association between a subscriber and a shared secret as described in the Applicant's co-pending application Ser. No. 12/004,645, the entire contents of which are herein incorporated by reference.

Figure 6:
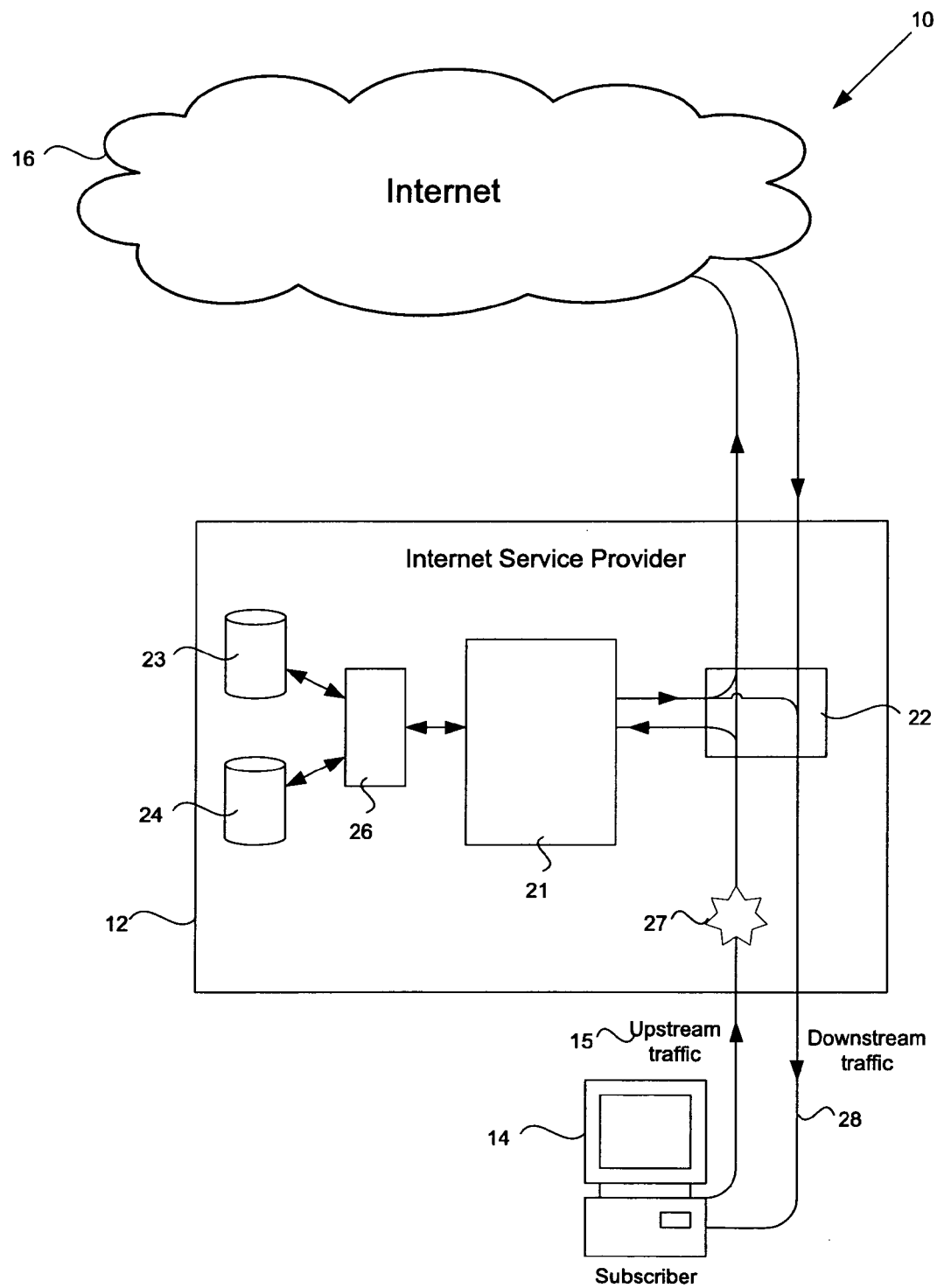
FIG. 6 represents an alternative network configuration.

Downstream traffic from the internet 16, indicated by path 28 is routed by the router 22 to the intended subscriber 14. Upstream traffic in the form of data packets 27 follow the path 15 from the subscriber 14 to be routed by the router 22 to the redirection device 21, thence back to the router 22 and onto the internet 16. In an alternative embodiment shown in FIG. 6, upstream traffic 15 passes directly through the Internet provider with the addition of a "mirror port" or "tap" allowing the redirector, 21, to monitor the upstream traffic.

Figure 2:
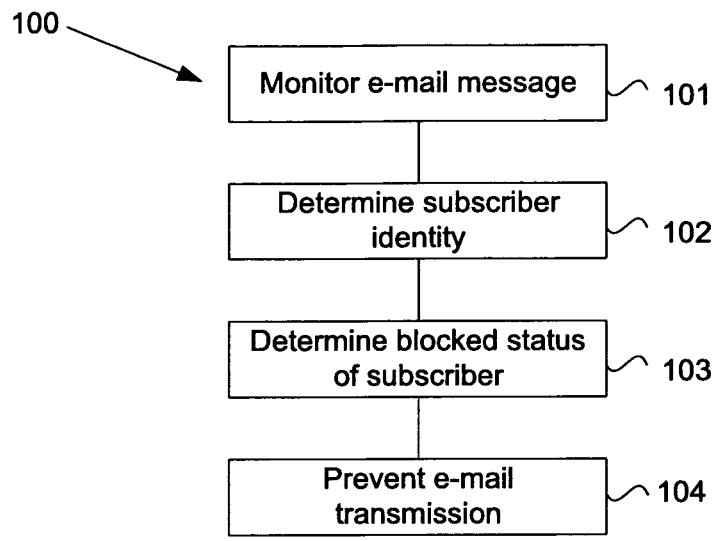
FIG. 2 represents a method for preventing e-mail transmission in accordance with an embodiment of the present disclosure.

The operation of the system 10 will now be described with reference to FIG. 1 and to the flowchart 100 illustrated in FIG. 2. At step 101, an e-mail message is received and a subscriber associated with the e-mail message is identified at step 102. The system 10 then determines if the subscriber is a blocked subscriber (step 103), and if the subscriber is a blocked subscriber, the transmission of the e-mail message is prevented (step 104).

Figure 3:
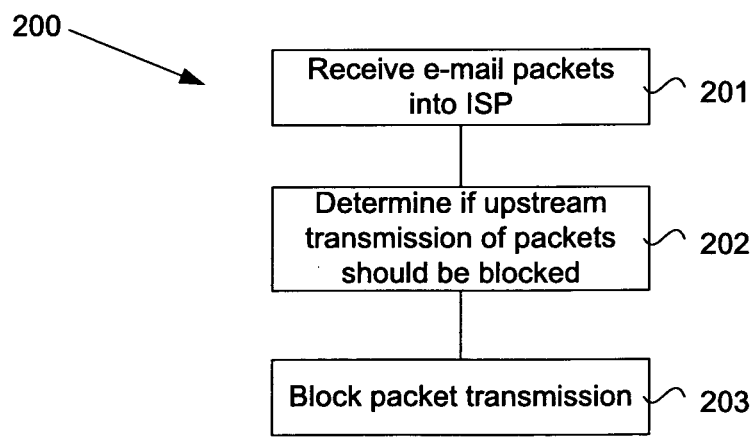
FIG. 3 represents a method for preventing email packet transmission in accordance with an embodiment of the present disclosure.

In one embodiment, the method steps described above are performed within the ISP as illustrated in the flowchart 200 of FIG. 3. At step 201, data packets 27 originating at the subscriber are received in the ISP 12 and provided to the router 22. The router 22 passes selected packets to the redirection device 21 for processing. For example, the router may determine if a data packet is a relevant e-mail packet, such as an SMTP SYN packet, which indicates the commencement of an email message.

If an appropriate e-mail packet is identified, the redirection device 21 determines if the upstream transmission of the e-mail message is to be blocked, (step 202). Firstly, the redirection device 21 analyzes the e-mail data packet 27 to retrieve an IP address of the e-mail data packet 27. The redirection device 21 forwards the IP address to the consolidation and management device 26, which executes a first query on the address provisioning database 23 to retrieve a subscriber identity associated with the IP address. The consolidation and management device 26 then executes a second query on the database 24 using the retrieved subscriber identity to retrieve the subscriber's sending rate profile which is forwarded to the redirection device 21. The redirection device 21 analyzes the received sending rate profile to determine a transmission status for the subscriber. If the sending rate profile indicates an e-mail sending rate outside of allowed parameters, the redirection device 21 takes steps to block the transmission of the e-mail data packet 27 (step 203), otherwise, the data packet is redirected back to the router 21 where it continues transmission on the upstream path 29. The attempt to send the e-mail data packet is incorporated into the sending rate profile which is updated in the database 24.

In one embodiment, the subscribers are blocked from sending e-mail messages by injecting a blocking packet into the e-mail data stream. The blocking packet destroys the e-mail connection and stops the e-mail message from sending. For example, the redirection device may generate and inject an SMTP packet that mimics the subscriber packet, i.e. correct peer, port, and sequence numbering, with the reset flag set. This packet is obeyed by the upstream operating system which drops the connection. Alternatively or in addition, a packet having a reset flag set may be injected downstream 28 to the subscriber 14, i.e. mirroring the sender packet, so that the e-mail message is blocked by terminating the connection from the subscriber end. Other methods for automatically blocking the e-mail message may be apparent to the person skilled in the art and are considered equivalent.

The sending rate profile stored in database 24 determines whether a subscriber is blocked from sending emails. Every time an SMTP SYN packet is received from a subscriber, the subscriber's sending rate profile is updated. In one embodiment, the subscriber is placed into the blocked state if the subscriber's sending rate is greater than 20 per minute. In one embodiment, the subscriber is placed into the blocked state if the subscriber's sending rate is greater than 30 per minute. In one embodiment, the subscriber is placed into the blocked state if the subscriber's sending rate is greater than 40 per minute. In one embodiment, the subscriber is placed into the blocked state if the subscriber's sending rate is greater than 50 per minute. The person skilled in the art will understand that the above exemplary sending rates are offered as examples only and that the specific sending rate required to place the subscriber into the blocked state may be arbitrarily chosen by the ISP. In addition, the sending rate required to place a subscriber into the blocked state need not be fixed by may be dynamically adjusted depending on various factors such as current bandwidth utilization. In tests conducted by the present Applicants where unsolicited emails were being sent, the threshold sending rate was typically exceeded within a few seconds, resulting in the user being blocked quickly.

In one embodiment, the system may allow the automatic unblocking of blocked subscribers. In order to unblock a subscriber, the sending rate must drop below a required threshold, which may be the same threshold that was exceeded to block the subscriber or may be a different threshold. In one embodiment, the test required to release the subscriber from the blocked state is made more stringent than the test required to block the subscriber, for example by setting the blocked threshold to be at least three times greater than the unblocked threshold. In one embodiment, the subscriber is placed into the unblocked state if the subscriber's sending rate is less than 10 per minute. In one embodiment, the subscriber is placed into the unblocked state if the subscriber's sending rate is less than 5 per minute. In one embodiment, the subscriber is placed into the unblocked state if the subscriber's sending rate is less than 5 per two minutes. In one embodiment, the subscriber is placed into the unblocked state if the subscriber's sending rate is less than 5 messages in 5 minutes.

The sending rate profile of a subscriber may store an additional blocked status flag indicating the current blocked/unblocked status of the subscriber. The blocked status flag may be used to determine which threshold is applied to the sending rate profile when a new e-mail message is sent by the subscriber. In one embodiment, the consolidating and management device 26 updates the sending rate profiles only when new e-mail messages are sent by the subscriber. In this embodiment, a blocked subscriber will remain blocked until the subscriber attempts sending an e-mail within a timeframe allowable by the threshold parameters. In an alternative embodiment, the consolidating and management device 26 may periodically run a check query on the sending rate profile database 24 to calculate the sending rates of subscribers within a current timeframe. If the query indicates that the sending rate profile for any blocked subscriber has fallen below the rate required to unblock the subscriber, the subscriber's blocked status flag may be reset to the default unblocked status. It is important to note that the above process although being automatic, also reduces significantly, the incidences of "false positives" since an intermittent intentional and valid sending of a relatively large set of e-mail messages by a subscriber will result in a rapid restoration to the unblocked status, normally not differentiated from normal Internet conditions, and the messages from the subscriber will ultimately get through.

When a subscriber is initially blocked, the redirection device can trigger the sending of a message to the subscriber indicating the blocked status and suggesting remedies to fix the problem. A message may be sent through any suitable medium such as by an e-mail to the subscriber.

Figure 4:
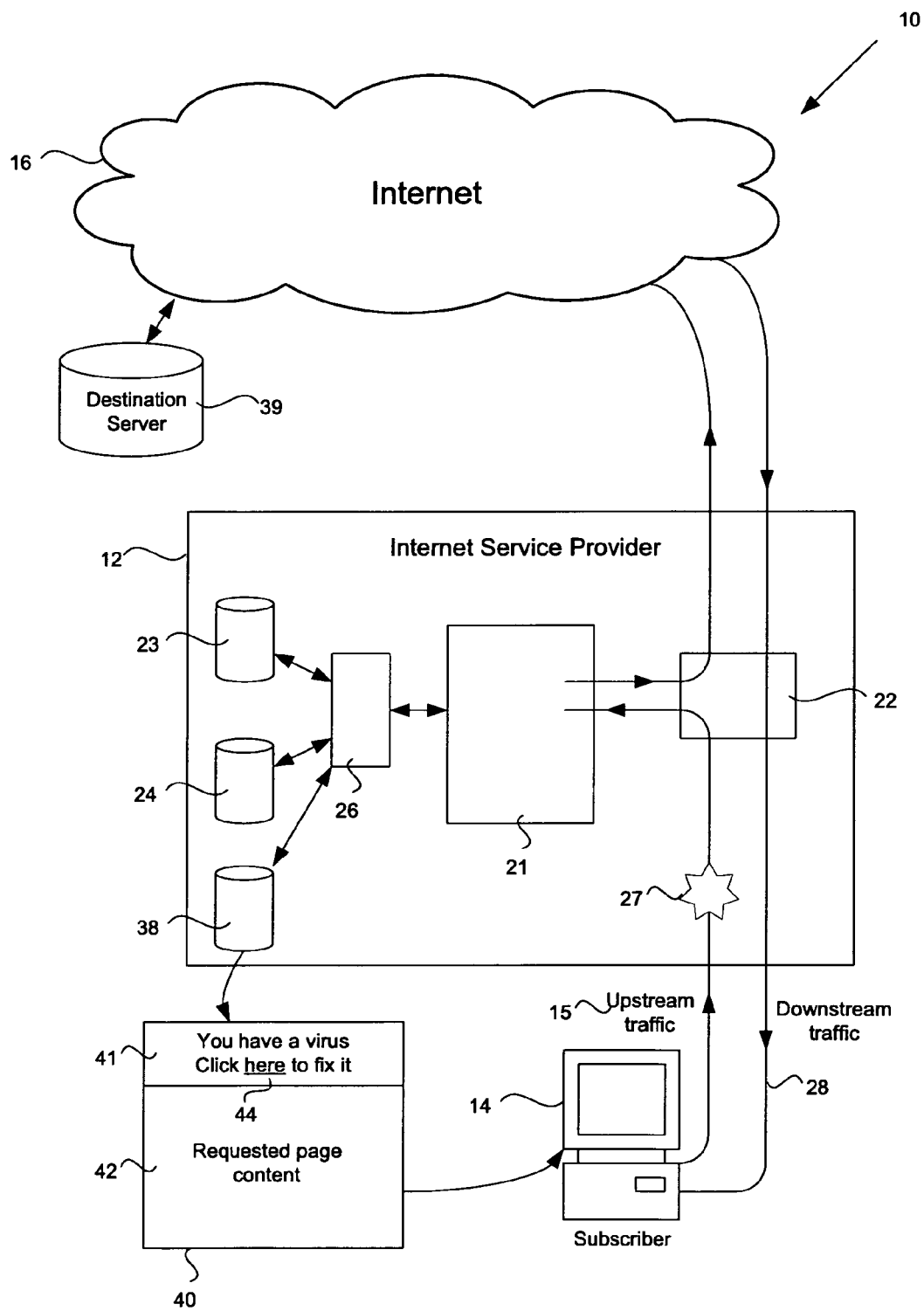
FIG. 4 schematically illustrates providing a notification to a subscriber of a blocked status.

In an alternative embodiment, a web-browser message may be sent to the subscriber, using the techniques described in the Applicant's earlier applications referenced above. For example, with reference to FIG. 4, when a subscriber 14 is initially blocked, a flag may be set in a policy database 38 that identifies the subscriber as requiring notification of the actions taken by the ISP 12. When the redirection device 21 receives a web page request, the redirection device 21 processes the TCP SYN packet to determine the IP address. The redirection device 21 then checks, via the consolidating and management device 26 whether a notification is pending for the current subscriber associated with the IP address. If a notification is pending, the redirection device 21 provides to the subscriber an HTML redirection to destination server 39 that combines the destination URL in the page request and the URL for the message into a new page redirection for the subscriber's browser to fetch. In one embodiment, in addition to the requested page content 42, the new page 40 includes a banner 41 or similarly visible message that indicates to the subscriber 14 that the subscriber's computer is sending a high rate of e-mails and has been blocked. The banner may indicate that the subscriber's computer has a virus and include a hyperlink 44 to a downloadable disinfection facility for removing the virus. In one embodiment, the new page 40 may include an authentication code that verifies the authenticity of the virus indication to the subscriber. In one embodiment, the authentication code may be a shared secret, for example as described in the Applicant's co-filed application, Ser. No. 12/004,645 referenced above.

Figure 5:
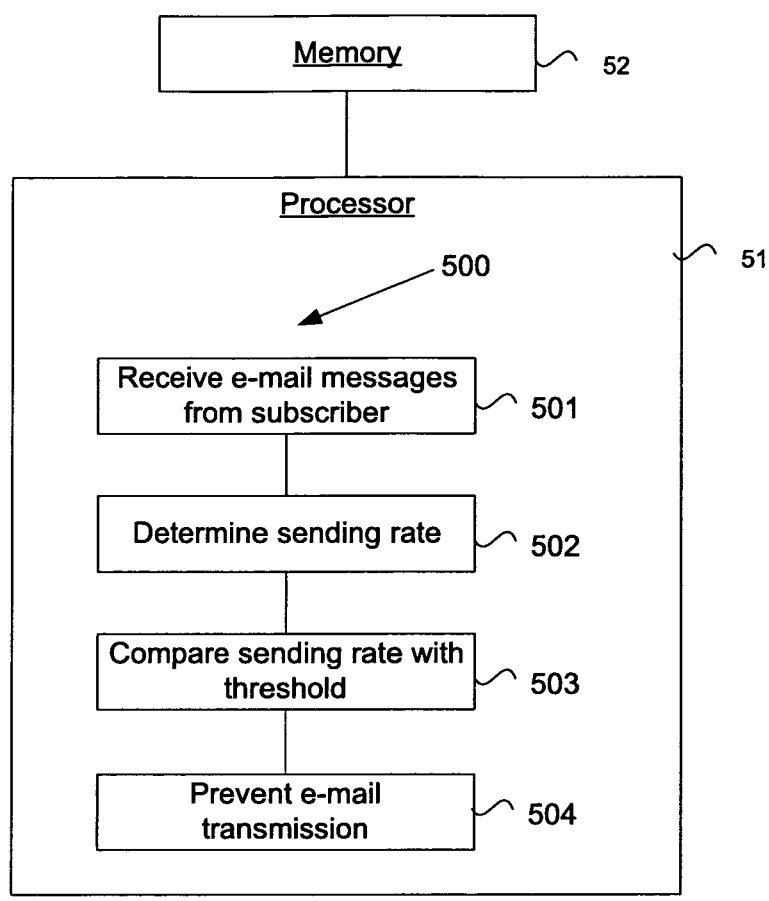
FIG. 5 represents a processor executing an instruction set for preventing an e-mail transmission.

In one embodiment depicted in FIG. 5, the ISP 12 includes at least one processor 51 operatively associated with at least one memory 52. The memory 52 stores an instruction set 500 executable on the processor 51. When executed, the processor 51 receives a plurality of e-mail messages from the subscriber (501). The processor 51 then determines a sending rate of the e-mail messages (502) and compares the sending rate with a threshold (503). If the sending rate is above an allowable threshold, the processor 51 prevents transmission of at least one of the e-mail messages (504).

One advantage of the above described embodiments is that by relying on the subscriber identity instead of merely the IP address, the system can prevent viruses and trojans from thwarting the system should the subscriber acquire a different IP address. The subscriber identity is a fixed identity, typically an identity assigned by the provider provisioning system such as a modem serial number or MAC address and can not be changed by the virus or trojan.

While one redirection device is shown within the ISP, the person skilled in the art will readily understand that any number of redirections devices may be provided for processing upstream data packets. In particular, separate redirection devices may be provided for separate channels within the ISP. Typically, a single consolidating and management device can be used to manage a plurality of redirections devices and to execute the queries to the databases. However, the person skilled in the art will readily understand that a plurality of consolidating and management devices may be employed.

An advantage of the embodiments herein described includes allowing the behavior of unsolicited email senders to be monitored while maintaining the block on the e-mails. That is, attempts to send e-mails may continue through the sending of fresh SMTP SYN packets even though the e-mails are not successfully transmitted. The placement of a new SMTP SYN packet will maintain the sending rate profile outside of the allowed parameters, thereby maintaining the block on the subscriber.

An advantage of the embodiments herein described include that spam-sending issues can be resolved rapidly using network devices that are relatively simple to install within the ISP and do not require all network traffic to pass through them. In particular, the redirection device 21 requires only read-only access to the data packets that it processes. A further advantage is that the embodiments may be implemented without updates being required to subscriber hardware or software and thus are instantly applicable across all subscribers to the ISP.

While a single ISP has been described and illustrated, the person skilled in the art will readily understand that a plurality of ISPs may be provided that utilize a common electronic mail management system or that each have an associated electronic mail management system as described above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of blocking an electronic mail transmission comprising:
    monitoring an electronic mail message at a point on a transmission path;
    determining a subscriber associated with said electronic mail message;
    determining if said subscriber is a blocked subscriber;
    if said subscriber is a blocked subscriber, preventing transmission of said electronic mail message from said point, and every time any identified electronic mail message is received from the subscriber, the subscriber's sending rate profile is updated to indicate a subscriber's attempt to send the electronic mail message, wherein the sending rate profile stores a status flag indicating whether the subscriber is currently blocked from transmitting electronic mail messages based on determining whether the subscriber has attempted to transmit a predefined number of email messages over a predefined period of time;
    determining, via the status flag, whether the subscriber is exceeding at least one threshold applied to the sending rate profile every time said any identified electronic mail message is received from the subscriber;
    identifying an e-mail packet and determining an upstream transmission of the e-ail message is to be blocked;
    analyzing the e-mail packet to retrieve an IP address of the e-mail packet and executing a query on a database to retrieve a subscriber identity associated with the IP address and to retrieve the subscriber's sending rate profile; and
    blocking the subscriber from sending electronic mail messages by injecting a blocking packet into an electronic mail data stream, which destroys an electronic mail connection and stops the electronic mail messages from being sent, the blocking packet mimicking a subscriber packet by including at least one of a peer, port, and sequence numbering.

2. The method according to claim 1 wherein determining if said subscriber is a blocked subscriber comprises:
    retrieving the sending rate profile associated with the subscriber identity from at least one database, said sending rate profile indicating a sending rate of electronic mail messages by said subscriber; and
    determining if said sending rate profile indicates if said subscriber is a blocked subscriber, and wherein every time an identified electronic mail packet is received from a subscriber, the subscriber's sending rate profile is updated.

3. The method according to claim 2 wherein said sending rate profile comprises a blocked status flag that indicates a blocked status if a sending rate of electronic mail messages by said subscriber is above an allowed threshold; the method further comprising processing said blocked status flag.

4. The method according to claim 2 wherein determining if said sending rate profile indicates if said subscriber is a blocked subscriber comprises determining if an electronic mail sending rate associated with said subscriber is above a threshold rate.

5. The method according to claim 2 further comprising:
    calculating a current sending rate of electronic mail messages by said subscriber; and
    utilizing said current sending rate to update said sending rate profile of said subscriber.

6. The method according to claim 5 wherein calculating a current sending rate utilizes said electronic mail message.

7. The method according to claim 5 wherein a subscriber is determined to be a blocked subscriber if said current sending rate is above a first threshold.

8. The method according to claim 7 wherein a blocked subscriber is determined to be an unblocked subscriber if said current sending rate is below a second threshold.

9. The method according to claim 8 wherein said first threshold is greater than said second threshold.

10. The method according to claim 9 wherein said first threshold is at least three times greater than said second threshold.

11. The method according to claim 1 wherein preventing transmission of said electronic mail message from said point on said transmission path comprises providing a transmission that destroys a connection between the subscriber and an intended recipient of said electronic mail message.

12. The method according to claim 11 wherein said transmission comprises a reset transmission.

13. The method according to claim 12 wherein said transmission comprises an SMTP packet in which a reset flag is set.

14. The method according to claim 1 further comprising providing a notification message to said blocked subscriber indicating that a blocking action has been performed.

15. The method according to claim 14 further comprising:
    detecting a URL page request from a blocked subscriber; and
    redirecting said URL page request such that the subscriber retrieves a URL page comprising said notification message.

16. The method according to claim 15 wherein said URL page comprises a hyperlink to a virus removal facility.

17. A system, comprising:
    at least one internet service provider that provides an internet connection for one or more subscribers; and at least one electronic mail processing apparatus comprising:

at least one database; and at least one query engine coupled to a processor that executes one or more queries on said at least one database;

wherein said electronic mail processing system apparatus receives an electronic mail message received by said at least one internet service provider from said one or more subscribers;

wherein said query engine executes a first query on said at least one database to determine a subscriber identity associated with said electronic mail message;

wherein said query engine executes a second query on said at least one database to determine a transmission status associated with said subscriber identity;

wherein said electronic mail message is transmitted dependent on said transmission status, and every time the identified electronic mail message is received from the subscriber, the subscriber's sending rate profile is updated to indicate a subscriber's attempt to send the electronic mail message;

wherein the sending rate profile stores a status flag indicating whether the subscriber is currently blocked from transmitting electronic mail messages based on determining whether the subscriber has attempted to transmit a predefined number of email messages over a predefined period of time;

wherein that status flag is used to determine whether the subscriber is exceeding at least one threshold applied to the sending rate profile every time said identified electronic mail message is received from the subscriber;

wherein an e-mail packet is identified and a determination is made that an upstream transmission of the e-mail message is to be blocked;

wherein the e-mail packet is analyzed to retrieve an IP address of the e-mail packet and the subscriber identity is associated with the IP address; and wherein the subscriber is blocked from sending electronic mail messages by injecting a blocking packet into an electronic mail data stream, which destroys an electronic mail connection and stops the electronic mail messages from being sent, the blocking packet mimicking a subscriber packet by including at least one of a peer, port, and sequence numbering.

18. A system configured to provide internet service, the system comprising:

at least one router apparatus; and a packet processing engine coupled to a processor;

wherein said at least one router routes one or more electronic mail packets identifying a recipient to said packet processing engine;

wherein said packet processing engine determines if said one or more electronic mail packets are to be blocked;

wherein if said one or more electronic mail packet are to be blocked, said packet processing engine routes a blocking packet to said router;

wherein an e-mail packet is identified and a determination is made that an upstream transmission of the e-mail message is to be blocked;

wherein the e-mail packet is analyzed to retrieve an IP address of the e-mail packet and the subscriber identity is associated with the IP address and a database is queried to retrieve a subscriber identity associated with the IP address and to retrieve the subscriber'sending rate profile;

wherein said router transmits said blocking packet towards said recipient which blocks the subscriber from sending electronic mail packet by destroying an electronic mail connection, which stops the electronic mail packets from being sent, the blocking packet mimicking a subscriber packet by including at least one of a peer, port, a sequence numbering, and every time any identified electronic mail packet is received from a subscriber, the subscriber's sending rate profile is updated to indicate a user's attempt to send the electronic mail message;

wherein the sending rate profile stores a status flag indicating whether the subscriber is currently blocked from transmitting electronic mail messages based on determination whether the subscriber has attempted to transmit a predefined number of email messages over a predefined period of time; and wherein that status flag is used to determine whether the subscriber is exceeding at least one threshold applied to the sending rate profile every time said identified electronic mail message is received from the subscriber.

19. The system according to claim 18 wherein said router routes SMTP SYN packets to said packet processing engine.

20. A method of operating an internet service provider comprising:

receiving one or more packets into the internet service provider from a subscriber;

determining if transmission upstream of said one or more packets is to be blocked; and if said transmission upstream of said one or more packets is to be blocked, blocking upstream transmission of said one or more packets, and every time any identified packets are received from the subscriber, the subscriber's sending rate profile is updated to indicate a subscriber's attempt to send an electronic mail message, wherein the sending rate profile stores a status flag indicating whether the subscriber is currently blocked from transmitting electronic mail messages based on determination whether the subscriber has attempted to transmit a predefined number of email messages over a predefined period of time;

determining, via the status flag, whether the subscriber is exceeding at least one threshold applied to the sending rate profile every time said any identified electronic mail message is received from the subscriber;

identifying an e-mail packet and determining an upstream transmission of the e-mail message is to be blocked;

analyzing the e-mail packet to retrieve an IP address of the e-mail packet and executing a query on a database to retrieve a subscriber identity associated with the IP address and to retrieve the subscriber's sending rate profile; and blocking the subscriber from sending electronic mail messages by injecting a blocking packet into an electronic mail data stream, which destroys an electronic mail connection and stops the electronic mail messages from being sent the blocking packet mimicking a subscriber packet by including at least one of a peer, port, and sequence numbering.

21. The method according to claim 20 wherein determining if transmission upstream of said one or more packets is to be blocked comprises determining a rate of receiving SMTP SYN packets from said subscriber and comparing said rate to an allowable threshold.

22. A non-transitory computer readable storage medium configured to store computer instructions that when executed causes a processor to perform:

receiving a plurality of electronic mail messages from a subscriber;

determining a sending rate of said plurality of electronic mail messages;

comparing said sending rate with a threshold;

preventing transmission of at least one of said electronic mail messages if said sending rate is above said threshold, and every time any identified electronic mail messages are received from the subscriber, the subscriber's sending rate profile is updated to indicate a subscriber's attempt to send the electronic mail message, wherein the sending rate profile stores a status flag indicating whether the subscriber is currently blocked from transmitting electronic mail messages based on a determination whether the subscriber has attempted to transmit a predefined number of email messages over a predefined period of time;

determining, via the status flag, whether the subscriber is exceeding at least one threshold applied to the sending rate profile every time said any identified electronic mail message is received from the subscriber;

identifying an e-mail packet and determining an upstream transmission of the e-mail message is to be blocked;

analyzing the e-mail packet to retrieve an IP address of the e-mail packet and executing a query on a database to retrieve a subscriber identity associated with the IP address and to retrieve the subscriber's sending rate profile; and blocking the subscriber from sending electronic mail messages by injecting a blocking packet into an electronic mail data stream, which destroys an electronic mail connection and stops the electronic mail messages from being sent, the blocking packet mimicking a subscriber packet by including at least one of a peer, port, and sequence numbering.

23. The non-transitory computer readable storage medium according to claim 22, further comprising instructions for generating the blocking packet and transmitting said blocking packet towards an intended recipient of said at least one of said electronic mail messages.

\* \* \* \* \*